Feb. 9, 1932.  F. S. O'NEIL ET AL  1,843,955
COTTER
Filed Feb. 8, 1929
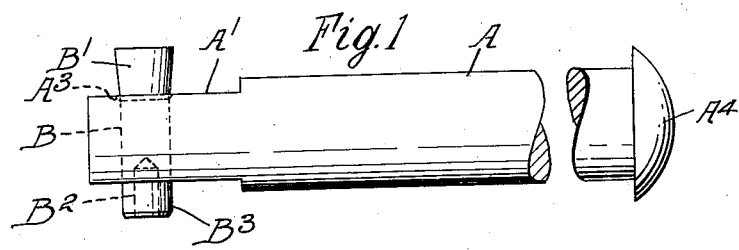
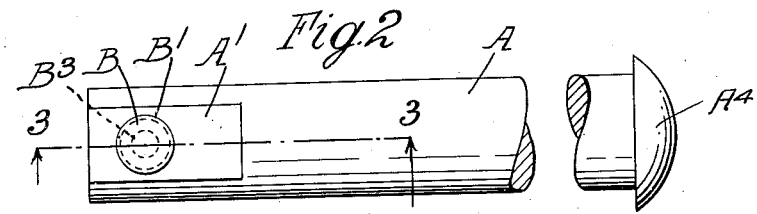
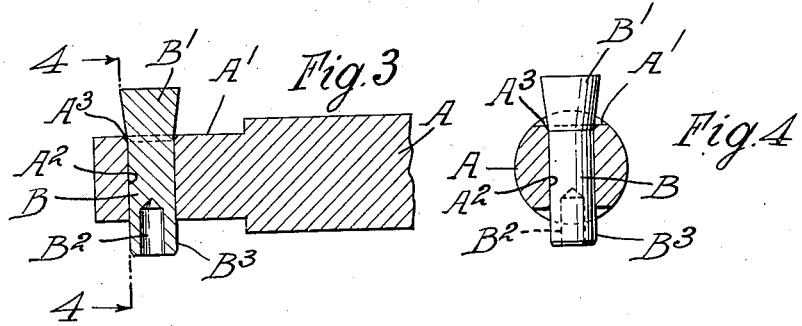
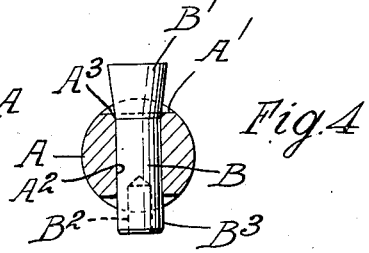
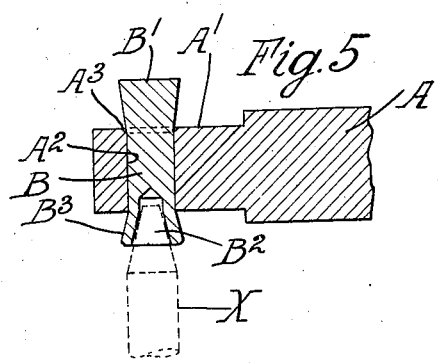
Inventors
Frank S. O'Neil
Edward L. McKinney
by Parker & Carter
Attorneys Patented Feb. 9, 1932

1,843,955

UNITED STATES PATENT OFFICE

FRANK S. O'NEIL AND EDWARD L. McKINNEY, OF INDIANAPOLIS, INDIANA, ASSIGNORS TO LINK-BELT COMPANY, OF CHICAGO, ILLINOIS, A CORPORATION OF ILLINOIS

COTTER

Application filed February 8, 1929. Serial No. 338,422.

This invention relates to an attaching means adapted for use as a pin to hold a number of parts together. One object is to provide a substitute for a cotter pin which may be used as readily as the latter, but is more substantial. Another object is to provide a member which can be readily positioned and permanently fixed in that position without the need of complicated tools. Other objects will appear from time to time in the course of the specification and claims.

The invention is illustrated more or less diagrammatically in the accompanying drawings wherein:

Figure 1 is a side elevation of the fastener in position;

Figure 2 is a plan view of the same;

Figure 3 is a longitudinal transverse cross section taken on line 3—3 of Figure 2;

Figure 4 is a transverse cross section taken on line 4—4 of Figure 3;

Figure 5 is a view similar to Figure 3 showing the completion of the fastening operation.

Like parts are designated by like characters throughout the specification and drawings.

A is a member which may, for example, be a shaft or rod or in some cases, a pintle of a chain. It is provided with a flattened portion $A^1$ and a perforation $A^2$ through this flattened portion $A^1$. At one end of the perforation it may be slightly flared as at $A^3$. $A^4$ is a head on the pintle A.

B is a fastening member. As here shown it is in the form of a pin. It is provided with a flared enlarged end $B^1$ and within the opposite end is formed a hole $B^2$. The wall $B^3$ surrounding the perforation $B^2$ may be flared as shown in Figure 5 by any suitable tool, such as that shown at X in Figure 5.

In the form shown, the attaching means is used in place of a cotter for holding together the links and pins of a chain. The invention, however, is not limited to this association and might be used anywhere where it is desirable to fasten the parts against separation.

It will be realized that while we have shown and described an operative device, many changes might be made in the size, shape, relation, proportion and distribution of parts without departing materially from the spirit of our invention, and we wish therefore, that our description and showing be considered as in a large measure diagrammatic.

The use and operation of this invention are as follows:

When it is desired to fasten together, for example, links and pins of a chain, a pin such as the one indicated at A is provided, with a perforation, and when the link has been positioned on the pin, the attaching member B is inserted through the hole, a tool X, for example, is inserted in the hole of the attaching means and is forced into said hole so as to swell or expand the walls of the hole outwardly as indicated in Figure 5. Thus each end of the pin is in effect given an outwardly tapered end and accidental displacement or removal of the pin is prevented. Heretofore cotters have been used for service of this type and the present invention provides a more substantial means for holding together the parts.

As the perforated end of the pin is expanded or flared the pin itself is drawn more fully into the perforation in the member A, that is to say, the tapered end is drawn or forced more fully into the perforation in the member A, as a result of the flaring of the perforated end of the pin.

When the tool X is inserted in the cylindrical opening $B^2$ in the end of the member B, the wall of this opening is expanded and flared into the conical outline shown in Figure 5. As the tool penetrates into that part of the opening $B^2$ which is inside the boundaries of the member $A^1$, the member B is expanded against the walls of the perforation within which it is positioned. This point of expansion or point where the tapered portion engages the walls of the outer perforation, limits the position of the beginning of the cone. Thereafter inward movement of the member X expands and enlarges the member B not into conical form but cylindrically against the walls of the perforation containing it and when the point of the member X finally reaches the bottom of the hole, if pressure is continued it tends to exert a pressure on the mass of the member B, which expands the entire member, causing it to make a close contact with the walls of the hole or aperture containing it, throughout its entire length.

We claim:

1. In combination with a member having an opening and adapted to receive another member, a pin adapted to be inserted into said opening, said pin having a tapered end, tapering evenly from the remainder of the pin, the tapering portion blending with the pin to produce a pin free from abrupt changes of direction, and being hollow throughout a portion of its length from its opposite end, said hollow portion being adapted to be flared outwardly and when so flared being adapted of itself to prevent accidental removal of the pin from the member in which it is positioned.

2. In combination with a member having an opening and adapted to receive another member, a unitary pin adapted to be inserted into said opening, said pin having a tapered end the tapering portion blending with the pin to produce a pin free from abrupt changes of direction and provided with means for tightening it to prevent accidental removal and for drawing the pin farther into the opening within which it is positioned, said means including the opposite end of said pin, the latter being perforated and adapted to be outwardly distorted to engage the member within which it is positioned to prevent accidental removal therefrom and to draw the pin as a whole more tightly into the perforation within which it is positioned.

3. In combination with a member having an opening and adapted to receive another member, a unitary pin adapted to be inserted in the opening, said pin having at one end an expanded head larger than the opening and having a central longitudinal perforation extending from its other end toward the head, the distance between the head where it engages the member and the bottom of the perforation being less than the thickness of the member where it engages the pin, the pin being adapted to be expanded where it projects beyond the member, by pressure applied to that portion of the pin which projects beyond the member and adapted to be expanded to fill the opening in the member by pressure applied directly to that portion of the pin contained within the member.

4. In combination, a pintle pin having a head at one end and provided at its opposite end with a pair of diametrically opposed flattened portions, adapted to receive a side bar, there being a perforation formed in the end of the pintle and passing through the flattened portions, an annular depression formed about one end of said perforation and a cotter pin member seated in the perforation, adapted to restrain the side bar, the cotter pin having a tapered end, the tapered end being seated in the depression about the perforation, the cotter pin provided in its opposite end with a perforation extending inwardly to a point beyond the flattened portion, the perforated end of the pin adapted to be flared outwardly to draw the pin into the perforation and to lock it against displacement therefrom.

Signed at Indianapolis, county of Marion, and State of Indiana, this 30th day of January, 1929.

FRANK S. O'NEIL.
ED. L. McKINNEY.